Jan. 23, 1934.    J. E. BALES ET AL    1,944,394
CABINET
Filed June 20, 1930    6 Sheets-Sheet 1
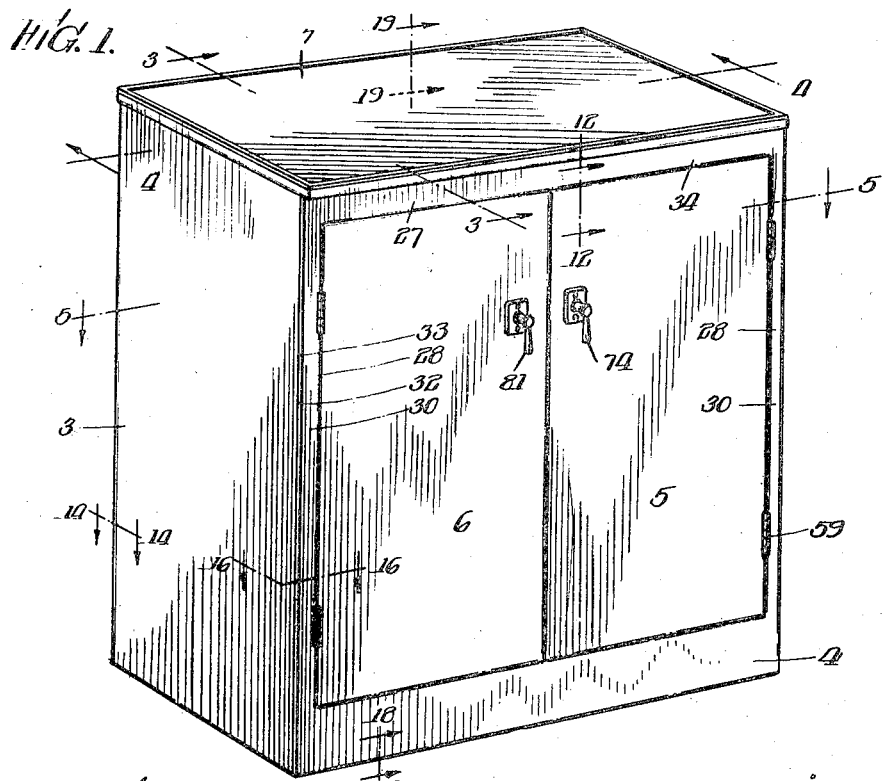
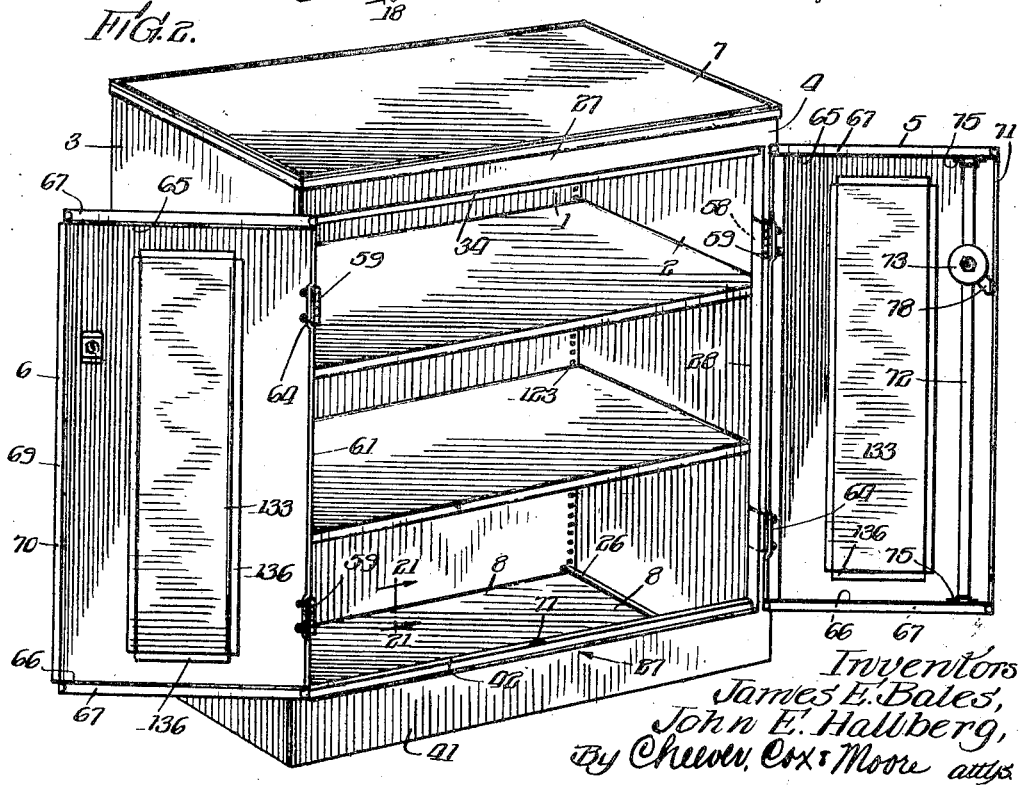
Inventors
James E. Bales,
John E. Hallberg,
By Cheever, Cox & Moore attys.

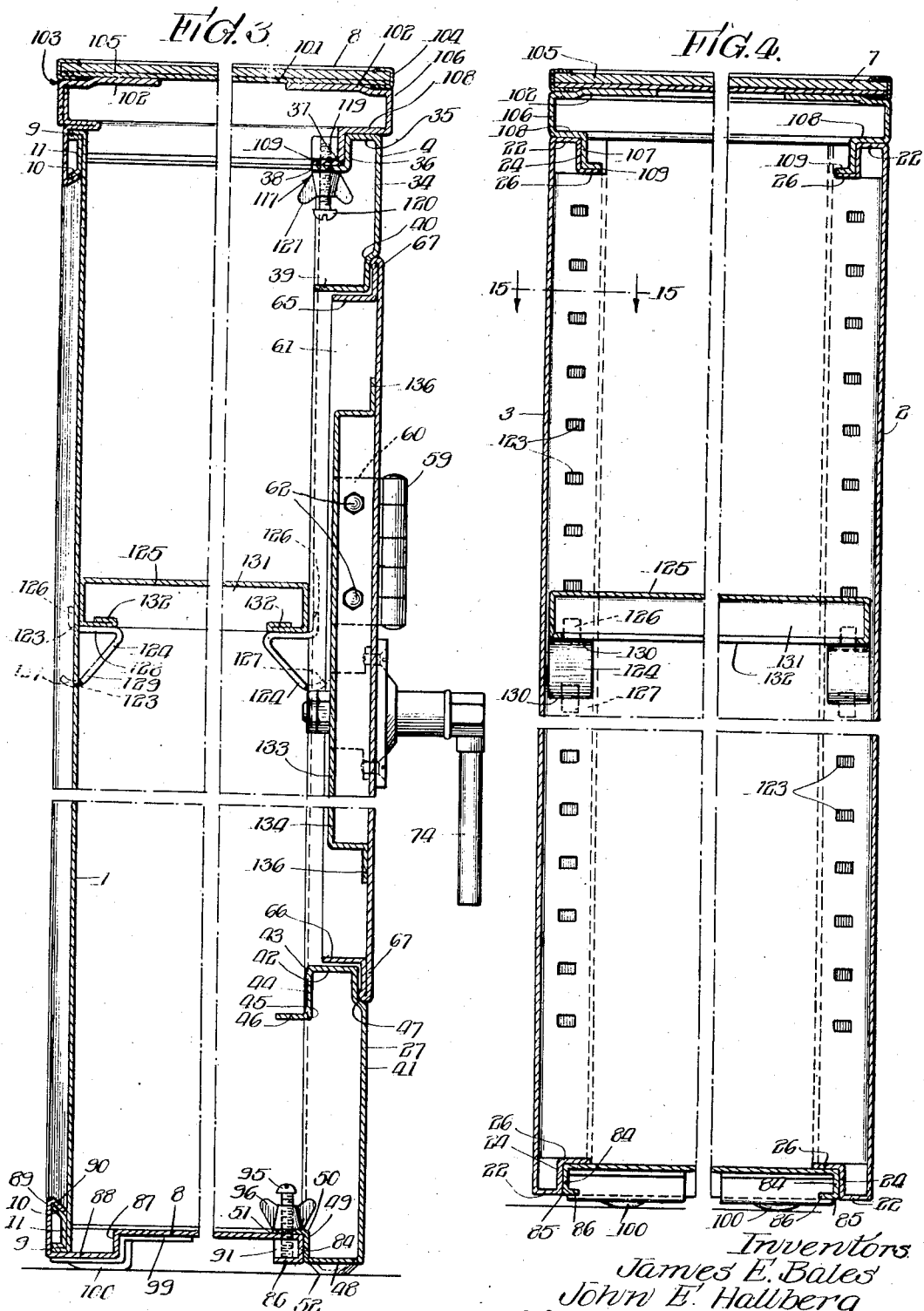

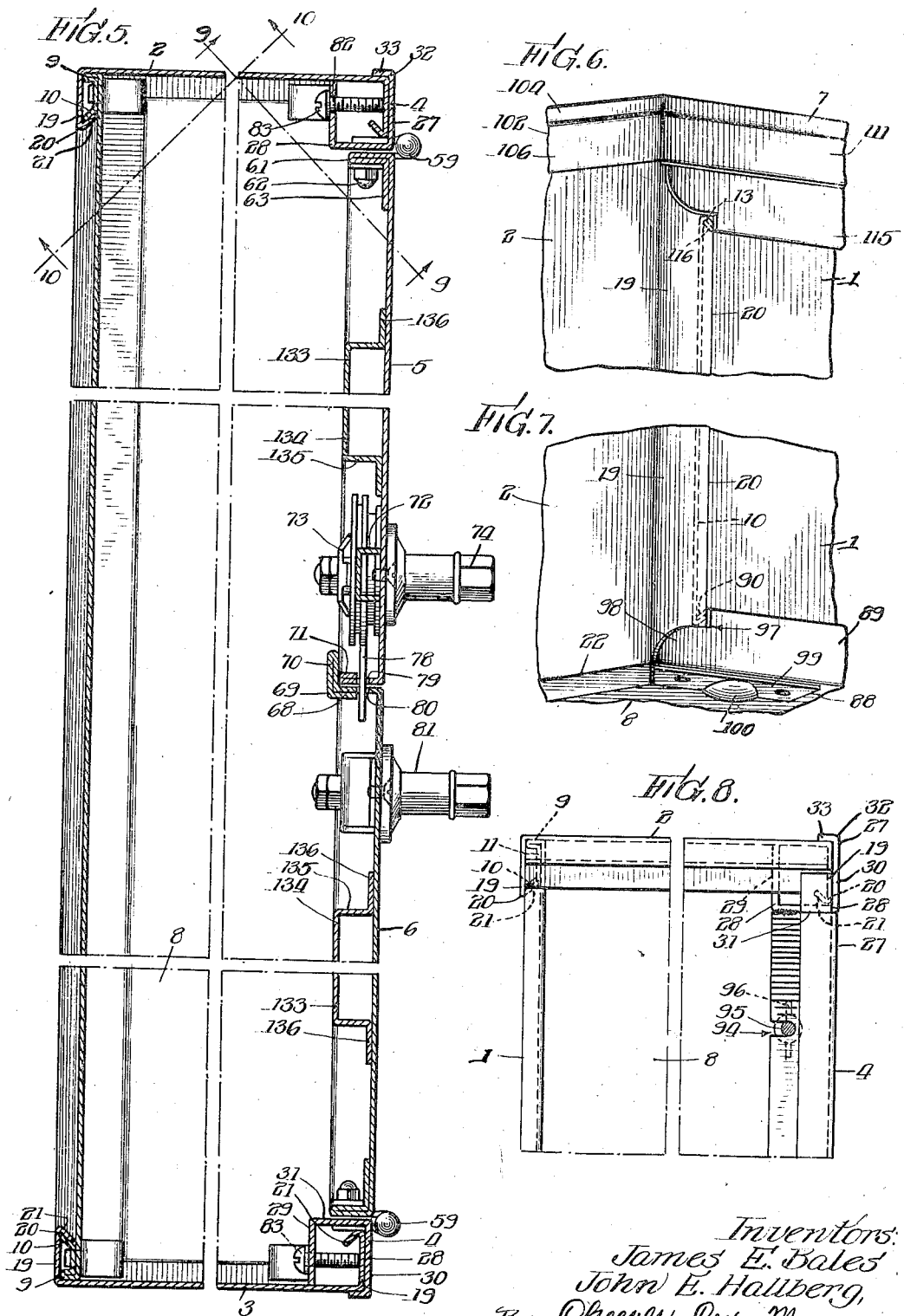

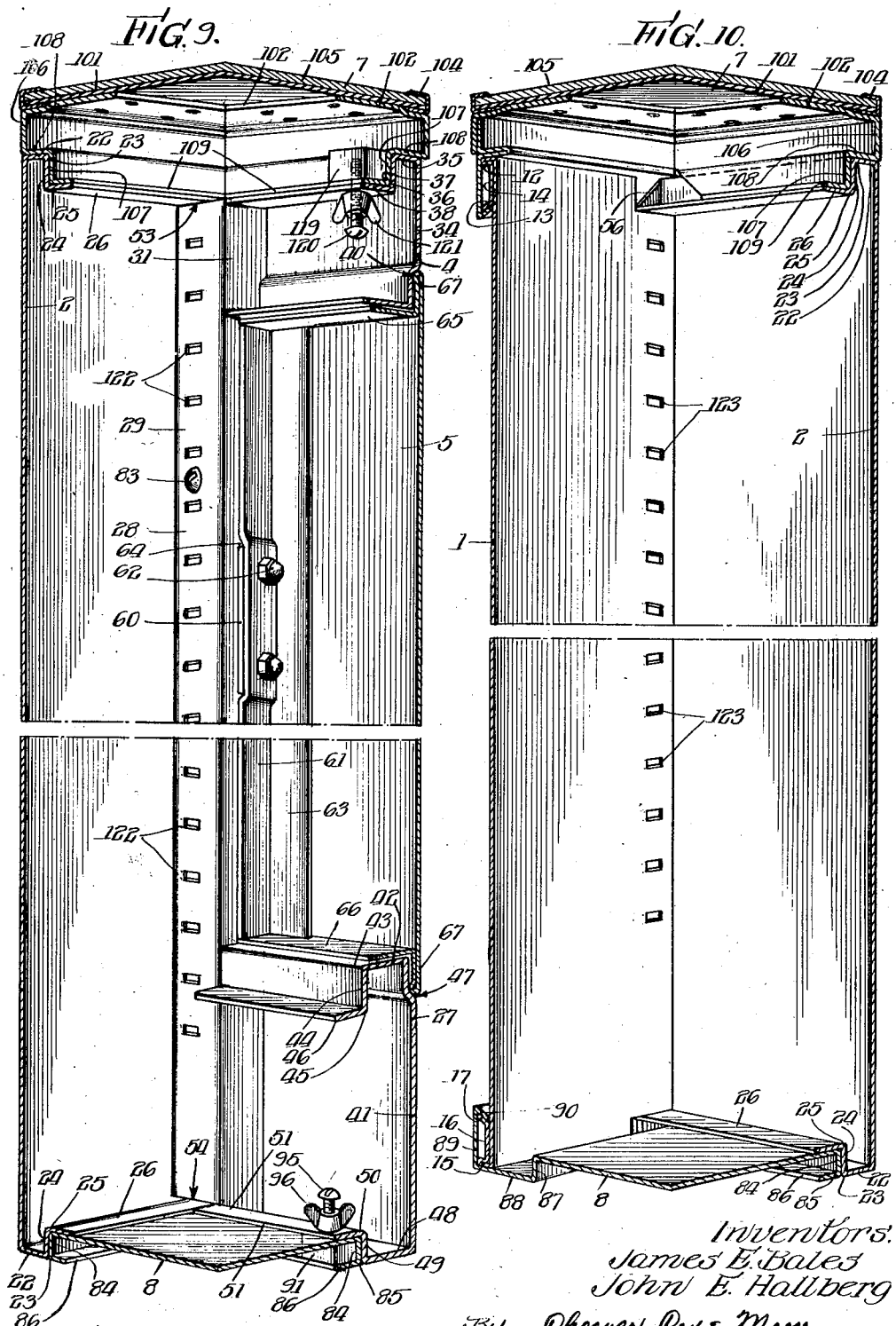

Jan. 23, 1934.   J. E. BALES ET AL   1,944,394
CABINET
Filed June 20, 1930   6 Sheets-Sheet 5
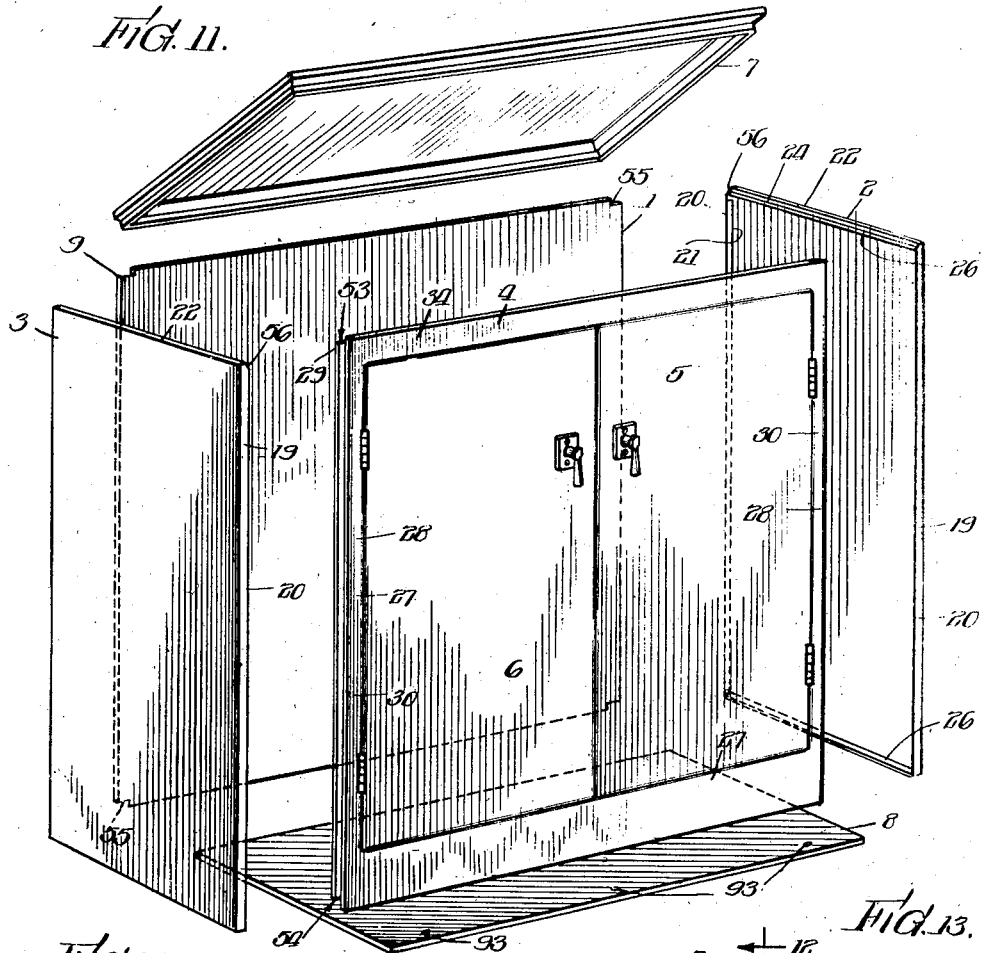
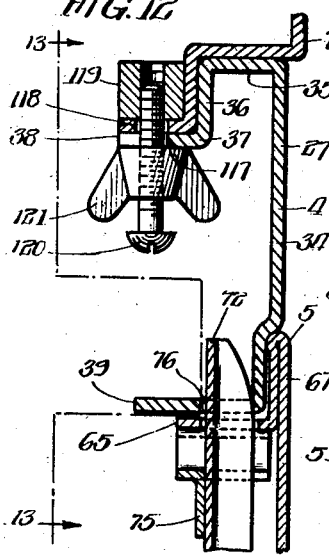
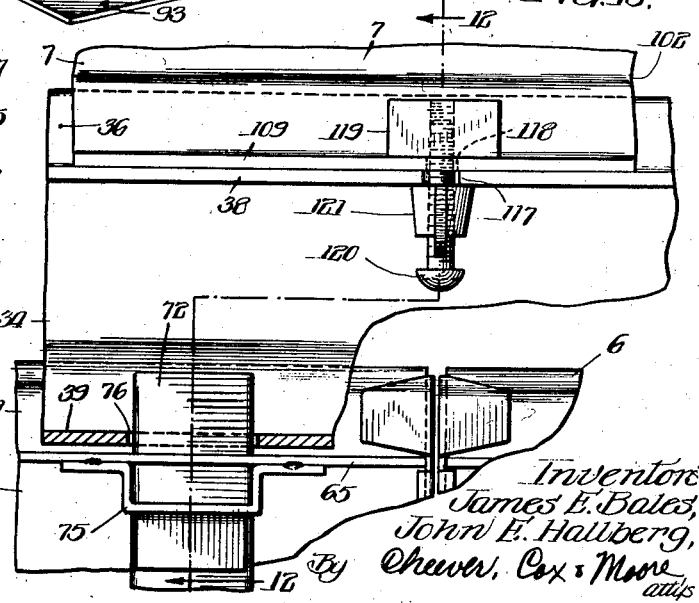
Inventors
James E. Bales,
John E. Hallberg,
By Cheever, Cox & Moore
attys

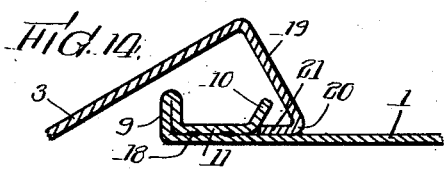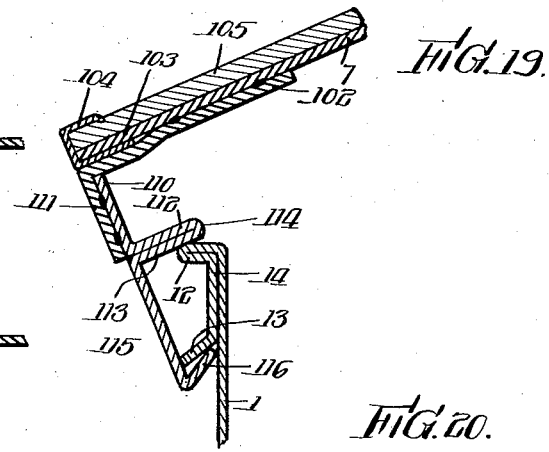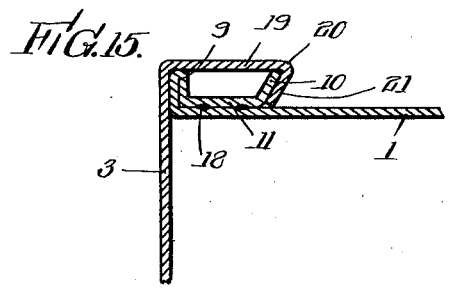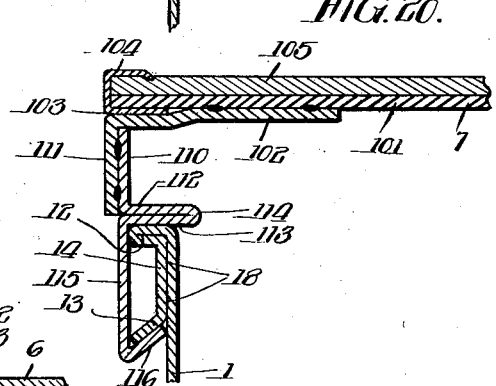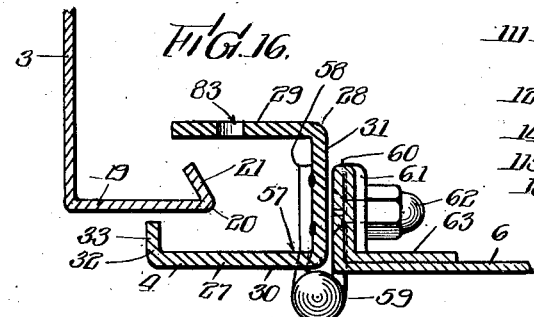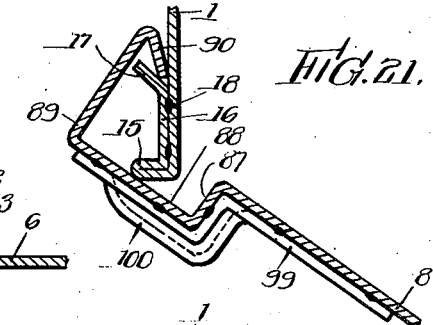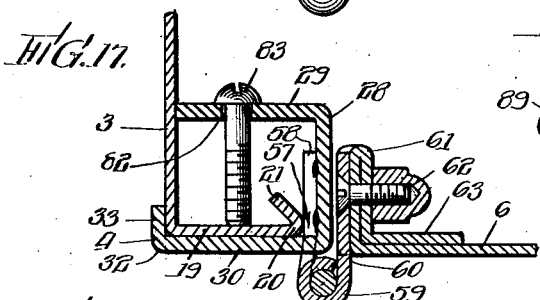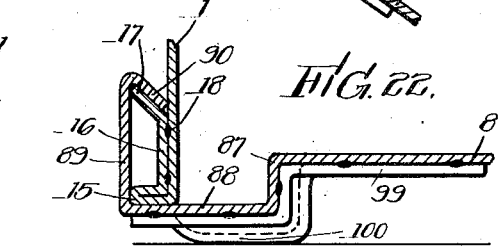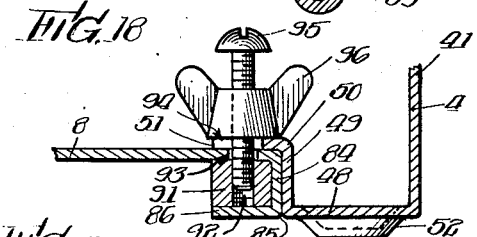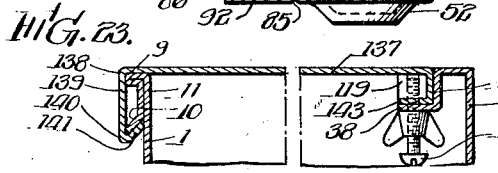

Patented Jan. 23, 1934

1,944,394

UNITED STATES PATENT OFFICE 1,944,394

CABINET

James E. Bales, Aurora, and John E. Hallberg, Oswego, Ill., assignors to Lyon Metal Products, Incorporated, Aurora, Ill., a corporation of Illinois Application June 20, 1930. Serial No. 462,606

18 Claims. (Cl. 312—141)

This invention relates to sheet metal cabinets and the primary object of the invention is to provide a new and improved metal cabinet, various parts of which have interlocking engagement with other parts.

Another object is to provide a sheet metal cabinet which has new and novel interengaging parts, some of which are interchangeable and reversible.

Another object is to provide a metal cabinet having parts which are provided with interlocking flanges, the flanges being similarly arranged so that they will fit with their cooperating parts in various positions, other of said parts being duplicates and interchangeable.

A further object of the invention is to provide a metal cabinet which can be readily and economically manufactured, which can be quickly and economically assembled, which is rigid and durable in construction, and which can be readily "knocked down" or disassembled.

Numerous other objects and advantages will be apparent throughout the progress of the following specification.

The invention comprises in general a sheet metal cabinet comprising a front, back, two side walls, a top and a bottom. The sides have interlocking engagement with the front and back and are similarly constructed so that they are interchangeable. A top and bottom have interlocking engagement with the back and interfitting engagement with the sides and front. Bolts connect the free ends of the top and bottom to the front, these bolts being supplied with wing nuts permitting the entire structure to be assmbled in a very short space of time by merely manipulating a few wing nuts engageable from the front of the cabinet but arranged in the interior thereof. The front comprises a frame on which doors may be swingingly mounted, and locking means are provided for maintaining the doors in closed position.

The accompanying drawings illustrate a selected embodiment of the invention and the views therein are as follows.

Fig. 1 is a detail perspective view of the improved cabinet with the doors in closed position.

Fig. 2 is a similar view with the doors in open position.

Fig. 3 is a detail transverse vertical sectional view on the line 3—3 of Fig. 1.

Fig. 4 is a detail longitudinal vertical sectional view on the line 4—4 of Fig. 1.

Fig. 5 is a detail plan section on the line 5—5 of Fig. 1.

Fig. 6 is a detail view of a rear corner of the cabinet at the top thereof.

Fig. 7 is a detail perspective view of a rear corner of the cabinet at the bottom thereof.

Fig. 8 is a detail top plan view with the cabinet top removed showing the construction at the corners of the cabinet.

Fig. 9 is a detail perspective view of an inner corner on the line 9—9 of Fig. 5.

Fig. 10 is a similar view on the line 10—10 of Fig. 5.

Fig. 11 is a detail exploded view showing the arrangement of the various parts which constitute the cabinet.

Fig. 12 is a detail sectional view on the lines 12—12 of Figs. 1 and 13.

Fig. 13 is a detail rear elevation of the front looking in the direction of the arrows on the line 13—13 of Fig. 12.

Fig. 14 is a detail plan section on the line 14—14 of Fig. 1 showing how the parts are assembled.

Fig. 15 is a similar view showing the parts in assembled position on the line 15—15 of Fig. 4.

Fig. 16 is a detail plan section on the line 16—16 of Fig. 1 showing how the parts are assembled.

Fig. 17 is a similar view showing the parts in assembled position.

Fig. 18 is a detail vertical sectional view on the line 18—18 of Fig. 1.

Fig. 19 is a detail vertical sectional view on the line 19—19 of Fig. 1 showing how the parts are assembled.

Fig. 20 is a similar view showing the parts in assembled position.

Fig. 21 is a detail vertical sectional view on the line 21—21 of Fig. 2 showing how the parts are assembled.

Fig. 22 is a similar view showing the parts in assembled position.

Fig. 23 is a detail sectional view of a modified construction showing the manner in which the top may be formed and how it interlocks and interfits with other parts of the cabinet.

The cabinet comprises a back 1 with which the sides 2 and 3 have interlocking engagement. A front 4 is provided with a pair of swinging doors 5 and 6 and has interfitting engagement with the sides 2 and 3. A top 7 and a bottom 8 have interlocking engagement with the back and interfitting engagement with the sides and front frame.

The back 1, Figs. 5, 14, 15, has an outwardly extending bead 9 and an angularly extending flange 10 extending vertically on the rear of the back on each side thereof. The bead 9 and the flange 10 are formed by doubling over the metal at the sides of the back, the bead and flange being integral with the back and connected by an integral straight portion 11. The bead and flange are provided to interlockingly engage the sides.

A horizontal rolled edge or bead 12, and an angularly disposed flange 13 are provided on the rear of the back at the top thereof. This bead and flange are similar in all respects to the bead 9 and flange 10 on the sides of the back and are connected with a straight portion 14 which is similar to the straight portion 11 which connects the bead 9 and flange 10. The bead 12, flange 13, and straight portion 14 are integral with the back, being turned over therefrom and formed in the same manner as previously described relative to the side formation on the back, Figs. 19 and 20. The bottom edge of the back is folded over to provide the out-turned bead 15, the straight portion 16, and the flange 17. The bead 15, the straight portion 16, and the flange 17 are similar to the beads or rolled edges 9 and 12, the straight portions 11 and 14, and the flanges 10 and 13. The straight edges 11, 14, and 16 are welded to the main body portion of the back as indicated at 18, Figs. 14, and 19 to 22. The bead and flange construction is arranged on the rear of the back and tends to strengthen the back, make it rigid, and provides means for interlockingly engaging the back with the sides 2 and 3, the top 7, and the bottom 8.

The sides 2 and 3 are constructed exactly the same, having interlocking engagement with the back and interfitting engagement with the front. Each side has both its side edges turned inwardly to provide legs 19 which are bent at 20, Figs. 14 to 17 inclusive, to provide interlocking or engaging flanges 21. The side flanges 21 on the sides overlap and interlock with the side flanges 10 on the back. The legs 19 on the sides engage the ends of the flanges and also engage the outer edge of the beads 19. In connecting the sides to the back, the sides are positioned at an angle relative to the back as shown in Fig. 14, and then swung inwardly until the sides are at right angles to the back 1 as shown in Fig. 15. The sides and back are thus securely locked together.

The material at the upper and lower edges of each side, Figs. 4, 9, and 10, is bent to provide inwardly extending legs 22 which are bent at 23 to provide depending flanges 24. These depending flanges are bent at 25 to provide the inwardly extending ledges 26. This formation at the top and bottom of the sides is provided for interlockingly or interfittingly engaging the top 7 and bottom 8. The formation at the ends and sides of the side members is the same, thereby permitting interchangeability of the sides and permitting each side to be inverted. In other words, the side 2 may be substituted for the side 3 and turned so that the upper edge of the side 2 can be the lower edge of the side 3. This construction provides for the duplication of certain parts, thereby cutting manufacturing costs considerably and also permitting the structure to be more readily assembled.

The front 4 comprises an outer frame 27 having side channel members 28, Figs. 5, 8, 16, and 17. These channel members 28 extend substantially the full height of the cabinet and comprise spaced inner and outer legs 29 and 30 respectively which are connected by a body portion or web 31. The leg 30 is bent at 32, Figs. 16 and 17, to provide an inturned lip or flange 33.

A top cross bar 34 connects the channel members 28 and is fastened securely thereto in any convenient manner such as by welding. This cross bar is substantially channel shaped, having an upper inwardly extending leg 35 which is bent to provide a leg 36. The leg 36 is bent at 37 to provide the inwardly extending ledge or flange 38, Fig. 3. This cross bar 34 has a lower inwardly extending leg 39 which defines the bottom edge of the bar. The outer face of the cross bar is provided with a depression 40 into which the upper edges of the door extend to bring the outside face of the doors substantially flush with the outer face of the cross bar.

A bottom cross bar 41 has an inwardly extending leg 42 which is bent at 43, Figs. 3 and 9, to provide the downturned flange 44. This flange may be bent at 45 to provide an inwardly extending ledge 46. The outer face of this lower cross bar is provided with an indentation 47 to receive the lower edge of the doors 5 and 6 so that the outer edges of the doors will be substantially flush with the outside of this lower cross bar when the doors are in closed position. This lower cross bar also has a lower inwardly extending leg 48 which is provided with an upturned flange 49. This flange 49 is bent at 50 to provide the inwardly extending ledge 51, Fig. 3. The formation at the bottom of the bottom cross bar provides a pocket or recess into which the cabinet bottom 8 is received. This lower cross bar is rigidly fixed to the side channel members 28 in any convenient manner such as by welding. Protuberances 52 are struck outwardly from the leg 48 to provide supports for the cabinet, Figs. 3 and 18.

The inner legs 29 of the channel members 28, Fig. 9, are cut away at 53 and 54 at their upper and lower edges respectively to make the ends of the channel members flush with the upper and lower inturned flanges or ledges 26 and 51 respectively. The back has its outer edges cut out at 55, Fig. 11, while the ends of the side members are formed as designated at 56, Fig. 11, to permit the various parts to freely interlock and interfit with other parts.

The channels 28, Figs. 16 and 17, are provided with longitudinal slots 57 inwardly of the channel body portion or web 31 to receive legs 58 of the hinges 59. The free legs 60 of the hinges 59 are connected to the side door flanges 61 through the medium of the fastening means 62. The flanges 61 are formed by turning the metal of the door inwardly and then back upon itself as clearly shown in Figs. 16 and 17. The free end 63 of the metal is returned against the inside face of the doors and welded thereto to reinforce the doors and make them more rigid. The ends of the doors at the flanges may be depressed as indicated at 64, Figs. 2 and 9, to provide a recess into which the free legs 60 of the hinges extend, thereby bringing the outside face of the hinge legs 60 flush with the inturned flange 61. The upper and lower edges of the doors 5 and 6, Figs. 3 and 9, are provided with inturned upper and lower flanges 65 and 66 which extend below and above the legs or ledges 39 and 42 on the top and bottom cross bars 34 and 41 respectively. These flanges are integral with the front of the doors and are formed integrally with the folded-over extensions 67 on the doors. These extensions extend beyond the legs or ledges 39 and 42 and are received in the depressions 40 and 47 to bring the front face of the doors substantially flush with the outside of the front 4. The door 6, Fig. 5, has an inwardly extending flange 68 which is bent at 69 to provide a lip or stop 70 against which the inturned flange 71 on the free end of the door 5 abuts. The flange 68, lip 70, and flange 71 are made integral with the doors and are formed by bending the metal back upon itself as clearly shown in Fig. 5. A locking rod 72 is mounted on the inside face of the door 5 and is extended or retracted by means of a locking element 73 which is controlled by a handle 74. Upper and lower clips 75 are fixed to the door 5 for supporting the locking rod 72. This locking rod extends through the upper and lower flanges 65 and 66 on the door and engages upper and lower recesses or slots 76 and 77, Figs. 2, 12, and 13, provided in the legs or ledges 39 and 42 in the upper and lower cross bars 34 and 41 respectively. The locking element 73 moves an arm 78, Figs. 2 and 5, through the slots 79 and 80, Fig. 5, in the flanges 71 and 68 in the doors 5 and 6 respectively for locking the door 6 to the door 5. Thus, when the handle 74 is operated, a locking element 73 operates the rod 72 to lock the door 5 to the cabinet structure and the arm 78 to lock the door 6 with the door 5. A handle 81 similar to the handle 74 may be mounted on the door 6 but is not movable and does not control any locking mechanism, Fig. 1.

The sides 2 and 3 are connected to the back 1 as shown in Figs. 14 and 15 and then shifted to position until the flanges or legs 19 on the sides are received within the channel members 28 as shown in Fig. 16. The sides are then moved until the outer faces of the flanges or legs 19 abut the inside faces of the channel legs 30 and the inside faces of the lips 33 abut the outside faces of the sides, Fig. 17. The legs 29 of the channel members 28 may be provided with threaded holes 82 with which bolts 83 have threaded engagement. These bolts, when screwed down to position, impinge the legs or flanges 19 on the sides against the legs 30 of the channels 28, thereby locking the sides in position within the channel members 28 and the lips 33, Fig. 17. The sides, back, and front are thus locked securely together and prevented from spreading or becoming disengaged.

The bottom 8 has its two side edges and its front edge provided with downwardly extending flanges 84, Figs. 3, 4, 9, 10, and 18, which are bent at 85 to provide the inwardly extending legs or ledges 86. The rear edge of the bottom is provided with a downturned flange 87, Figs. 21 and 22, from which a horizontal leg or ledge 88 is bent, the flange 87 being the same depth as the flanges 84 to bring the ledge or leg 88 in the same plane with the legs or ledges 86 on the sides and front of the bottom. The horizontal leg or ledge 88 has an upturned flange 89 integrally formed therewith from which a lip 90 is turned. The space formed by the flanges 87 and 89, the leg or ledge 88, and the lip 90 provide a pocket into which the lower end of the back 1 extends. The bottom is applied to the structure by tilting it until the ledge 90 engages the flange 17 on the back. The bottom is then tilted upwardly to position until the upper face of the bottom engages the bottom faces of the inturned flanges 26 and 51 on the sides and back respectively, Fig. 9. Nuts 91, Fig. 18, are supported on the ledge 86 at the front of the bottom member and abut the flange 84 so that their threaded openings 92 aline with the holes 93 in the bottom and the slots 94 at the edges thereof. Threaded members or bolts 95 have thumb or wing nuts 96 threadedly engaging the bolts 95. These bolts pass through the slots 94, holes 93 in the bottom and threadedly engage the openings 92 in the nuts 91 a predetermined distance. The wing or thumb nuts 96 are then operated on the bolts 95 to clamp the front edge of the bottom to the front 4 of the cabinet. The lip 90 and a part of the flange 89 is cut away as indicated at 97, Fig. 6, to permit the bottom to be brought freely in position. The flange 89 has an extension 98 provided thereon to bring the flange substantially flush with the outer corner of the structure and to overlap the inwardly extending legs or ledges on the sides to provide a relatively rigid construction at the lower rear corners of the cabinet. The bottom has a separate plate 99 welded thereto which is provided with protuberances 100 which are similar to the front protuberances 52 to provide rear legs or rests for the structure. The bottom may be attached quickly and readily to the back, two sides, and front and detached therefrom merely by the manipulation of the thumb nuts 96 and the bolts 95.

The top 7 comprises a metal plate 101, Figs. 19 and 20, to which an angle iron frame 102 is connected in any convenient manner such as by welding. This frame has a peripheral depression 103 into which a channel shaped outer bead or molding strip 104 is fastened to receive the composite top surfacing 105. The side and front edges of the peripheral frame 102, Figs. 4, 9, and 10, are bent to provide the vertical edges 106 and 107 to which are connected the straight ledges 108 and 109. The ledges 108 interfit with the sides and front, the ledges 108 resting upon the inwardly extending legs 22 on the sides and the inwardly extending leg 35 on the front cross bar 34. The ledges 109 on the top rest upon the inwardly extending ledges 26 on the sides, and the inwardly extending ledge or flange 38 on the front top cross bar 34. A longitudinal strip 110, Figs. 19 and 20, is welded to a downwardly extending leg 111 which is integral with the angle iron frame 102. This strip has an inwardly extending portion 112 which is returned upon itself as indicated at 113 to provide an inturned ledge or flange 114. The metal then extends downwardly to provide the edge 115 from which the flange or lip 116 is turned. The formation of the flange or ledge 114, the edge 115, and flange or lip 116 provides a pocket into which the flange 13 and the bead 12 on the back 1 are received. In fastening the top to the cabinet, the top is inclined at an angle as shown in Fig. 19 with the lip 116 engaging the flange 13. The top 7 is then swung downwardly to the position shown in Fig. 20 when the lip 116 will engage the flange 13 and the flange 114 will rest on top of the turned end of the bead 12 on the back 1. When the rear edge of the top is connected with the upper edge of the back, the peripheral frame on the sides and edges of the top will nest between the cabinet sides 2 and 3 and the cabinet front 4 with the ledges 108 and 109 resting on the ledges or legs 22 and 26 on the sides and legs or ledges 35 and 38 on the front 4.

The edge 115 has its ends cut away as shown in Fig. 6 to permit the lip 116 to engage freely with the flange 13 on the back. The edge 115 is provided with end extensions as shown in Fig. 6 which extend beyond the outer edges of the lip 116 and overlap the legs or edges 19 on the sides 2 and 3.

The inwardly extending leg or flange 38 on the top cross bar 34 is provided with spaced slots 117, Figs. 3, 9, and 13, which aline with spaced holes 118 provided in the inturned ledge 109 of the top frame 102. Nuts 119 are supported on the ledge 109 and bolts 120 having wing or thumb nuts 121 threadedly engaging the bolts extend through the alined slots and holes 117 and 118 and threadedly engage the nuts 119. The nuts 119, the bolts 120, and the wing nuts 121 are similar in all respects to the nuts 91, the bolts 95, and the wing nuts 96 and are for the purpose of locking the top to the front edge of the front 4. The bolts 120 threadedly engage the nuts 119 a predetermined distance. The clamping action for clamping the ledge 109 to the ledge 38 is caused by impinging these ledges between the wing or thumb nuts 121 and the nuts 119. The top 7 thus has interlocking engagement with the back 1, interfitting or nesting engagement with the sides 2 and 3 and the front 4, and locking engagement with the front 4 due to the impinging or clamping action of the nuts 119 and the wing nuts 121. The wing nuts 96 cooperate with the nuts 91 at the lower part of the cabinet and the wing nuts 121 cooperating with the nuts 119 at the upper part of the cabinet are arranged inside of the cabinet.

The channels 28 have a plurality of spaced openings 122 provided in their body or web portion 29 and aline horizontally with spaced openings 123, Figs. 9 and 10, provided in the back 1. Shelf clips 124 engage a pair of the openings 122 and 123 to support shelves 125.

The clips 124 have an upwardly extending lip 126 which engages one of the holes and a lower lip 127, Fig. 3, which engages a hole immediately below the hole engaged by the lip 126. A horizontal portion 128 supports the bottom of the shelves and is integral with the base portion 129 of the clips. The clips have shoulders 130, Fig. 4, on each side of the lips 126 and 127 to prevent lateral or swinging movement of the clips when they are positioned in the holes.

The construction of the back and its interlocking engagement with the sides, as shown in Fig. 15, provides a pocket between the straight portion 11 on the back and the legs 19 on the sides, into which the legs 126 and 127 of the clips 124 are received. This overlapping construction also conceals the openings 123 in the back to prevent the openings and the protruding legs on the clips from being seen from the outside of the cabinet. The overlapping of the straight side on the back, from which the flanges 10 are turned over, provides a double thickness of material where the holes 123 are formed. This double thickness of material about the holes 123 provides a substantial and rigid support for the clips 124. Aside from the purpose of providing an interlocking engagement between the back and the sides, the construction has a two-fold purpose, which is to provide a double thickness of material to strengthen the cabinet where the clips are inserted and to hide the ends of the clips 124.

The shelves 125 have a downwardly extending peripheral flange 131 extending thereabout which is bent inwardly to provide supporting flanges 132, Fig. 3. The supporting flanges 132 rest upon the surface 130 of the clips 124 as clearly shown in Fig. 3.

The ledge 46 extending inwardly from the front and integral with the lower front bar 41 is located slightly below the next to last holes 122 so that when a clip 125 is mounted in the two lowermost holes 122, the top of the clip will be in the same plane as the top of the ledge 46, whereby a shelf may be supported along its front edge by the ledge 46 and at its rear edge by a pair of clips 125 mounted in alined holes 122.

The doors 5 and 6, Figs. 2, 3, and 5, may have a reinforcing member 133 welded to their inside faces. These reinforcing members comprise a body portion 134 which is spaced from the rear side of the doors having legs 135 from which outturned flanges 136 are bent. These flanges are welded to the inside face of the doors to brace the doors and keep them rigid.

In assembling the cabinet the sides 2 and 3 are positioned at an angle relative to the back to permit the flanges 21 on the sides to engage the flanges 10 on the back. The sides are then swung at right angles to the back or perpendicular thereto until they assume the position shown in Fig. 15. After the sides are interlockingly connected with the back, the front 4 is applied. The flanges 19 on the front of the sides are inserted in the channel members 28 as shown in Fig. 16 and then brought to nesting position in the channels as shown in Fig. 17. The bolts 83 may then be positioned for lockingly holding the front to the sides.

The bottom 8 is then applied in position by tilting the bottom relative to the back 1 as shown in Fig. 21 so that the lip 90 on the bottom will engage the flange 17 at the bottom of the back 1. The bottom is then swung to position until its upper surface at the sides and front engages the inwardly extending flanges at the bottom of the sides and front. The nuts 91 are then positioned on the front ledge 86 and the bolts with their cooperating wing nuts 96 are then fastened in position to hold the bottom rigidly to the lower cross bar 41. The top is applied by holding the top at an angle relative to the back so that the lip 116 will become engaged with the lip 13 on the back as shown in Fig. 19. The front of the top is then lowered to the position shown in Fig. 20 when the lip 116 is engaged with the flange 13. When the top is in position, and the lip and flange engage each other, the peripheral frame 102 on the top will nest between the sides and inwardly of the front, causing the ledges on the top to rest upon the inturned ledges on the sides and front. The nuts 119 are then mounted on top of the ledge 109 so that the threaded openings in the nuts will aline with the openings 118 in the ledge 109 and the slots 117 in the ledge 38. The bolts 120 with their cooperating wing nuts 121 are then inserted in the alined slots and holes to threadedly engage the nuts 119. The wing nuts 121 are then tightened to impinge the ledges 109 and 38 between the nuts 119 and wing nuts 127.

The clips 124 are then positioned in the holes 122 and 123 to accommodate the shelves 125. When the doors 5 and 6 are closed and the handle 74 operated to attain the position shown in Fig. 1, the locking bar 72 will engage the slots provided in the upper and lower cross bars and the leg 78 will engage the slot provided in the door 6 to lock the structure.

In Fig. 23 there is shown a modified form of top construction. The top 137 shown in this figure is preferably the kind of top used for regular cabinet tops, while the top construction shown in the various other figures and particularly Figs. 19 and 20, is the type of top which is employed where the construction embodying the invention is used for counters and other similar purposes. The top 137 has its rear edge bent at 138 to provide a downwardly extending leg 139. This downwardly extending leg is bent at 140 to provide the inturned, inclined flange 141. This flange 141 has interlocking engagement with the flange 10 formed on the back 1. The front of the top 137 has a downwardly extending leg 142, from which an inturned lip 143 is formed. The lip 143 rests upon the ledge or flange 38 on the front crossbar 34. The nuts 119 rest upon the ledge or lip 143 and receive the bolt 120 for clamping the top 137 in position by means of the wing nuts 121. The modified top shown in Fig. 23 is the top which is preferred in some instances. This top can be more economically made than the top shown in Figs. 19 and 20 and provides for the same interlocking construction at its rear, and the same interfitting construction at its front as described relative to the top 7.

The cabinet therefore cannot be disassembled without first removing either the top or bottom. The front, sides, or back cannot be disassembled unless both the top and bottom are removed. The fastening means which comprises the bolts 83, 91, and 120 and their cooperating members are arranged in the interior of the cabinet which cannot be disassembled without first releasing these members. When the doors 5 and 6 are locked, the cabinet cannot, therefore, be disassembled.

The cabinet is assembled in a regular sequence, some of the parts acting as master parts to which access cannot be had except from the interior of the cabinet.

A cabinet constructed in accordance with the present invention is neat and ornamental in appearance, rigid and durable in construction, economical to manufacture, and can be assembled approximately at ten per cent of what it costs to erect cabinets of the conventional type and design. A cabinet can be shipped "knocked down", thereby reducing cost in handling and transportation considerably. The back is reversible, that is, the top edge may be positioned to accommodate the top 7 or inverted to accommodate the bottom 8. The sides are not only reversible but are also interchangeable. The side 2 may be substituted for the side 3 so that only five separate elements, one of which is duplicated, are required to make the finished cabinet. The reversability of the back and the reversability and interchangeability of the sides permits the structure to be assembled more readily than if the parts were not so constructed.

The cabinet herein shown is provided with a pair of doors. However, the number of doors which may be applied to the cabinet is immaterial. The cabinet may have one door instead of the two shown, or more than two doors may be employed if desired.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A cabinet comprising a back, flanges on said back, a side, flanges on the side, a flange on said side having interrelated engagement with a flange on the back, a front, spaced legs on said front and receiving an end of said side, and bolts passing through one of said legs and holding their ends on a flange of the side against the other leg for fastening said side to the front.

2. A cabinet comprising a pair of sides, a back and a front, vertical interlocking flanges on the sides and back and engaging each other for holding these members together, an exterior horizontal upper flange on said back, inwardly extending flanges on said sides and front, a top engaging the flanges on the sides and front, an inturned exterior flange on said top and overlapping the flange on the back and interlocking therewith, an inturned flange on the top and resting on a flange on the front, and fastening means for fastening the last two named flanges together.

3. A cabinet comprising a pair of sides, a back and a front, an exterior upper flange on said back and projecting outwardly from the normal plane thereof, inwardly extending flanges on said sides and front, a top, said top resting on the flanges of the sides and front, an exterior inturned flange on said top and engaging the underside of the upper flange on the back and interlocking therewith, and means inside of the cabinet and passing through the upper front flange and a part of said top for holding the top in locked position.

4. A cabinet comprising a pair of sides, a back, and a front, upper and lower horizontal flanges on said back, upper and lower inturned flanges on said sides and front, a bottom having its top engaging the lower flanges on the side and front and having interfitting relationship therewith, an exterior flange on said bottom and overlapping the lower flange on the back, a top having interfitting relationship with the upper flanges on the sides and front, and an exterior flange on said top and overlapping the upper flange on the back.

5. A cabinet comprising a pair of sides, a back, and a front, upper and lower horizontal flanges on said back, upper and lower inturned flanges on said sides and front, a bottom engaging the lower sides of the lower flanges on the sides and front and having interfitting relationship therewith, an exterior flange on said bottom and overlapping the lower flange on the back, a top having interfitting relationship with the upper flanges on the sides and front, an exterior flange on said top and overlapping the upper flange on the back, means passing through said lower front flange and the bottom and fastening the bottom rigidly to the front, and means passing through an upper flange and the top for fastening the top rigidly to the front.

6. An enclosing structure comprising six sides including a top and a bottom, all of said members having interlocking and interfitting relationship with a companion member on at least one side of each member, said top and bottom each having one edge thereof interlockingly and hingedly engaged with at least one of said sides and each having another edge free, means operated from the inside of the structure for locking the free ends of the top and bottom to a part of the structure, and doors for said structure to prevent access to the last named means.

7. A cabinet comprising a front having outwardly extending legs, one of said legs being longer than the other, a lip turned-over from the longer leg, a side overlapping the shorter leg and underlapping the lip, and a back interlocking with said side.

8. A cabinet comprising a front, outwardly extending legs on said front, doors for said front, one of said legs having slots therein, said doors having depressions along one edge thereof, hinges for said door and having parts thereof extending through said slots, another part of each of said hinges arranged in said depressions in the door and fixed thereto.

9. A cabinet comprising a back and a front, said front and back having rows of spaced holes, clips arranged in said holes, shelves removably supported by said clips, an inturned flange on said front, clips arranged in some of said holes so that the tops of said clips will be in the same plane as the top of said flange whereby a shelf may be supported by said flange and clips.

10. In a structure of the class described, a back, outwardly extending vertical flanges projecting from said back and situated inwardly a predetermined distance from the outer edge of said back, a side, an extension on said side, and a flange bent from said extension and adapted to engage the flange on the back, the extension projecting beyond the outer edge of the back and covering the vertical flange.

11. In a structure of the class described comprising a sheet metal back, the metal at an end of the back being folded over upon itself and then extending outwardly to provide a flange spaced from the edge of the back, a sheet metal side having an inwardly extending leg arranged rearwardly of the back, and a forwardly extending flange on said leg and engaging the flange on the back for interlocking the side to the back.

12. In a device of the class described, a front, an inwardly extending ledge on said front and spaced a predetermined distance above the bottom of the front, a bottom having a downturned flange bent therefrom and an inwardly extending projection bent from said flange and providing a recess, said bottom engaging the ledge, a nut arranged in said recess, and threaded fastening means passing through the ledge and bottom and engaging said nut for locking the bottom to the front.

13. In a structure of the class described comprising a sheet metal front, an inwardly extending leg bent from said front, an upwardly extending flange bent from said leg, an inwardly extending ledge bent from said flange, a bottom for said structure and having its top engaging the bottom of said ledge, a flange bent downwardly from said bottom and engaging the flange on said front, a leg bent inwardly from the flange on the bottom, the leg on the bottom being flush with the leg on the front, means carried by the leg on the bottom, and a member cooperating with said last named means for fastening the bottom to the front.

14. In a structure of the class described comprising a sheet metal back, an outwardly projecting exterior flange on said back and spaced a predetermined distance below the upper edge of the back, a top engaging the back and having an extension, an inturned flange on said extension and engaging the flange on the back, and a front for said structure and supporting the forward edge of the top.

15. In a structure of the class described comprising a sheet metal back, an exterior horizontal flange on said back and spaced a predetermined distance from the upper edge of the back, a top for said structure and having an inturned ledge engaging the top of the back, a downwardly extending projection on said top, a flange bent inwardly from said projection and engaging the horizontal flange on the back, a front supporting the forward edge of the top, and fastening means at the forward edge of the top and engaging the front for locking the top in position.

16. A cabinet comprising a pair of sides, a back and a front, inwardly extending horizontal flanges on said sides and front, vertical interlocking flanges on the sides and back for holding these members together, a bottom, said bottom having its top surface engaging the bottoms of the horizontal flanges on the sides and front, an outwardly extending horizontal flange on the back, an exterior flange on said bottom and overlapping the last named flange on the back, and fastening means for holding the bottom engaging the horizontal flanges on the sides and front.

17. A cabinet comprising a pair of sides, a back and a front, inwardly extending horizontal flanges on said sides and front, vertical interlocking flanges on the sides and back for holding these members together, a removable bottom, said bottom engaging the undersides of the horizontal flanges on the sides and front, an outwardly extending horizontal flange on the back, an exterior horizontal flange on said bottom and overlapping and interlocking with the horizontal flange on the back, and fastening means passing through said horizontal front flange and engaging the bottom for holding said bottom in place.

18. A cabinet comprising a back having horizontal and vertical flanges bent therefrom, all of said flanges being substantially the same shape and length, a pair of duplicate sides having flanges bent therefrom, a flange on each of the sides adapted for interlocking engagement with either of said vertical flanges on the back, a closure for the cabinet, a top, a bottom, flanges on said top and bottom interlocking with said horizontal flanges to swingingly support the top and bottom, and means inside of the cabinet to lock the top and bottom to a part of the cabinet.

JAMES E. BALES.
JOHN E. HALLBERG.